US007040775B2

(12) United States Patent
Opolka

(10) Patent No.: US 7,040,775 B2
(45) Date of Patent: May 9, 2006

(54) IMAGE-CASTING LED FLASHLIGHT

(75) Inventor: Rainer Opolka, Solingen (DE)

(73) Assignee: Zweibruder Optoelectronics GmbH, Solingen (DE)

( * ) Notice: Subject to any disclaimer, the term of this patent is extended or adjusted under 35 U.S.C. 154(b) by 0 days.

(21) Appl. No.: 10/853,474

(22) Filed: May 25, 2004

(65) Prior Publication Data

US 2004/0246726 A1 Dec. 9, 2004

(30) Foreign Application Priority Data

Jun. 3, 2003 (DE) .......................... 203 08 739 U

(51) Int. Cl.
*B60Q 3/00* (2006.01)

(52) U.S. Cl. ...................... 362/118; 362/186; 362/259; 362/806; 362/800; 362/29

(58) Field of Classification Search ................ 362/118, 362/489, 29, 253, 800, 806, 259, 186; 40/580, 40/701–704, 714–716
See application file for complete search history.

(56) References Cited

U.S. PATENT DOCUMENTS 1,350,042 A * 8/1920 Stealy ........................ 359/599
4,947,989 A * 8/1990 Horton .................... 206/387.1
5,343,376 A * 8/1994 Huang ........................ 362/259
5,619,182 A * 4/1997 Robb ......................... 340/479
5,642,931 A * 7/1997 Gappelberg ................. 362/186
5,951,149 A * 9/1999 Lee ............................ 362/259
6,133,907 A * 10/2000 Liu ............................ 345/183
6,224,244 B1 * 5/2001 Burys ......................... 362/489
6,439,723 B1 * 8/2002 Tano ........................... 353/15
6,491,395 B1 * 12/2002 Shirakura et al. .............. 353/7
6,844,686 B1 * 1/2005 Schneck et al. ......... 315/185 S
6,866,403 B1 * 3/2005 Schaak ....................... 362/284

FOREIGN PATENT DOCUMENTS

DE 200 06 761 8/2000

* cited by examiner

*Primary Examiner*—Sandra O'Shea
*Assistant Examiner*—Anabel Ton
(74) *Attorney, Agent, or Firm*—Andrew Wilford

(57) ABSTRACT

An image-casting flashlight has a housing adapted to hold a battery, a battery-powered LED light source mounted on the housing and directed forward along an axis, and a holder sleeve axially displaceable on the housing forward of and relative to the LED light source. An image carrier, e.g. a slide or a mask, is fixed in the holder sleeve and axially aligned with the light source. An end piece on the housing forward of the LED light source and of the image carrier holds a lens. Thus axial displacement of the holder sleeve moves the image carrier relative to the light source and to the lens.

9 Claims, 1 Drawing Sheet

FIG. 1
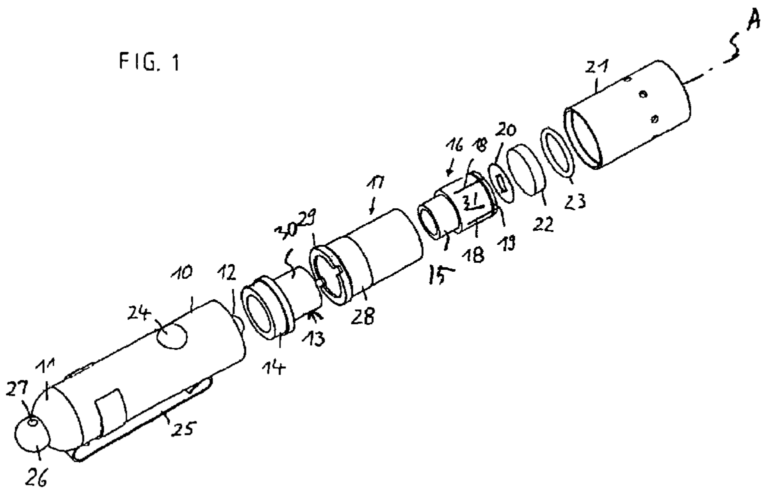
FIG. 2
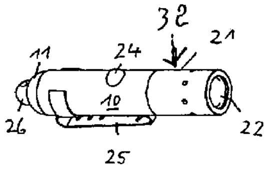
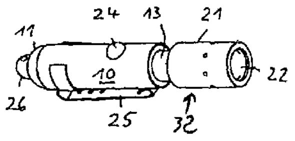
FIG. 3

IMAGE-CASTING LED FLASHLIGHT

FIELD OF THE INVENTION

The present invention relates to a flashlight. More particularly this invention concerns a flashlight that uses a light-emitting diode (LED) as light source and whose beam is an image so that it can be used as a pointer.

BACKGROUND OF THE INVENTION

An image-casting LED flashlight is known, for example, from German utility model 200 06 761 that has a housing adapted to hold a battery and a battery-powered LED light source mounted on the housing and directed forward along an axis. Three rods extending parallel to the axis forward from the housing slidably support an image holder forward of the LED light source and holding an image carrier axially aligned with the light source, and a lens holder forward of the LED light source and of the image carrier and holding a lens. The image carrier can be a photographic slide, that is a mainly transparent piece of plastic or glass with an image on it, or an opaque piece of metal or plastic into which a hole having the shape of the image is cut. Thus the light from the LED passes through the image carrier and is focused by the lens so the image can be cast on a surface. The two holders can slide on the rods so as to sharpen the image, to make the reciprocal of the image width and of the projection width correspond to the reciprocal of the focal width of the lens.

Such a flashlight can be used to cast the image, using for example a company logo as a pointer. Alternately, different images can be loaded so that someone making a presentation can have different pointers, or the image can simply be advertising when the flashlight is a key-chain giveaway.

The disadvantage of this system is that it is fairly complex and of bulky and cumbersome construction. It is not something one would drop in a pocket or pocket book, as that would likely damage the lens or image holder. In addition adjusting the relative positions of the lens and image holders is difficult, but needs to be done often to focus the image sharply at different distances.

OBJECTS OF THE INVENTION

It is therefore an object of the present invention to provide an improved image-casting LED flashlight.

Another object is the provision of such an improved image-casting LED flashlight which overcomes the above-given disadvantages, that is which is of simple and compact construction.

A further object is to make such a flashlight that can be adjusted fairly easily.

SUMMARY OF THE INVENTION

An image-casting flashlight has according to the invention a housing adapted to hold a battery, a battery-powered LED light source mounted on the housing and directed forward along an axis, and a holder sleeve axially displaceable on the housing forward of and relative to the LED light source. An image carrier, e.g. a slide or a mask, is fixed in the holder sleeve and axially aligned with the light source. An end piece on the housing forward of the LED light source and of the image carrier holds a lens. Thus axial displacement of the holder sleeve moves the image carrier relative to the light source and to the lens.

Such a construction is extremely simple and makes it possible to cast an extremely sharp image. Furthermore the structure is particularly compact, especially when the housing and end piece are made cylindrical and of the same diameter, containing the holder sleeve and image carrier, so that it can easily be mounted on a key chain or put in a pocket or pocketbook. The use of an LED instead of the standard incandescent bulb not only uses electricity much more efficiently, as an LED produces mainly light and little heat, but also makes the flashlight much more rugged.

The end piece is also according to the invention axially displaceable on the housing, so that the flashlight can be focused in two stages, first moving the image carrier, then the lens. The end piece includes an outer tube having a front end and an inner tube coaxially received and fixed in the outer tube, holding the lens at the outer-tube front end, and axially slidable on the holder sleeve. The outer and inner tubes have complementary inner and outer screwthreads by means of which they are connected fixedly together. This makes it fairly easy to change the lens when necessary.

Furthermore according to the invention the holder tube has a plurality of angularly spaced, axially extending, and axially forwardly open slots subdividing a front end of the holder tube into a plurality of radially deflectable segments. The image carrier is set in the holder-tube front end. An elastic ring engaged around the holder-tube front end presses the segments against the image carrier to lock it in place. Normally the holder-tube front end is formed with a radially outwardly open groove in which the elastic ring is seated, and with another radially inwardly open groove in which the outer edge of the image carrier, normally a circular disk, is seated.

The housing has a tubular front end centered on the axis, formed with a screw thread, and projecting axially forward of the light source. The holder tube has an axially rearwardly extending rear end threadedly engaged in the housing front end. The housing front-end screw thread is external and the holder rear end is internally threaded. The housing in fact includes a battery-holding rear sleeve having a front end and an adapter threaded into the rear-sleeve front end and formed with the housing front end. The adapter and the holder sleeve are wholly enclosed in the end piece and the housing. The image holder and the housing are thus interconnected by screwthreads. The end piece is a friction fit on the holder and is axially slidable thereon. Thus the end piece can be shifted axially to adjust the distance between the lens and the image carrier, and the end piece can be rotated, without shifting its position relative to the image carrier, so as to rotate the image carrier and change the distance between it and the light source. These two adjustments can therefore be carried out separately, by a single hand gripping the flashlight/pointer according to the invention.

BRIEF DESCRIPTION OF THE DRAWING

The above and other objects, features, and advantages will become more readily apparent from the following description, reference being made to the accompanying drawing in which:

FIG. 1 is an exploded view of the flashlight according to the invention; and FIGS. 2 and 3 are small-scale perspective views of the flashlight with the lens holder extended and retracted.

SPECIFIC DESCRIPTION

As seen in FIG. 1 a flashlight according to the invention has a main housing 10 formed as a cylindrical tube centered on an axis A and having a rear end in which is threaded a cap 11 having a button 26 with a hang-up hole 27 and a front end from which a LED light source 12 projects. Unillustrated batteries in the main housing 10 can be connected via a switch 24 on a side of the housing 10 to the LED 12 to cast a beam of light projecting forward along the axis A. A pocket clip 25 on the housing 10 can be pivoted around to cover the switch 24 and prevent its accidental actuation.

An adapter 13 has a large-diameter rear part 14 threaded into the front end of the housing 10 and an internally threaded smaller-diameter cylindrical front end 30 centered on the axis A. This adapter 13 therefore is, in the assembled condition, solidly and immovably connected to the main housing part 10.

A holder 16 has a tubularly cylindrical rear end 15 screwed into the front end 30 of the adapter 13 and a front end subdivided by four axially forwardly open slots 18 into four forwardly extending finger-like segments 31. An elastic ring 19 is set in a radially outwardly open circumferential groove near the extreme front end of the holder 16 to urge the four segments 31 radially inward. An image disk 20 that can be a plastic or glass slide bearing an image or an opaque metal or plastic disk through which is cut a shaped image-forming hole is set in a radially inwardly open groove formed at the front ends of the segments 31. Thus the ring 19 holds this disk 20 solidly in place in the holder 16. The axial spacing between the disk 20 and the light source 12 can be adjusted by screwing the holder 16 into or out of the adapter 13.

A front end piece 32 is formed by an outer sleeve or tube 21 of the same outside diameter as the main housing part 10, an inner sleeve or tube 17, a lens 22, and an O-ring 23. The rear end of the outer tube 21 is threaded onto an externally threaded rear end 28 of the inner sleeve 17 so this sleeve 17 presses the lens 22 against the O-ring 23 that in turn is pressed against an inwardly directed annular lip or ridge at the front end of the outer tube 21. Thus the parts 17, 21, 22, and 23 are all locked together in the assembled condition of the flashlight, with a short rear rim 29 of the inner tube 17 inset in the rear end of the outer tube 21.

The end piece 32 can move limited axially on the holder 16 between the rear or retracted position shown in FIG. 3 in which the flashlight has an overall length of about 8 cm and the front or extended position shown in FIG. 4 in which it is about 9 cm long. This allows the image to be focused by the lens 22 depending on the distance between the flashlight and the surface on which the image from the disk 20 is projected. Unillustrated stops are provided to prevent the end piece 32 from being pulled forward completely off the holder 16.

I claim:

1. An image-casting flashlight comprising:

a housing adapted to hold a battery;

a battery-powered LED light source mounted on the housing and directed forward along an axis;

a holder sleeve axially displaceable on the housing forward of and relative to the LED light source;

an image carrier fixed in the holder sleeve and axially aligned with the light source;

an end piece on the housing forward of the LED light source and of the image carrier; and a lens fixed in the end piece, whereby axial displacement of the holder sleeve moves the image carrier relative to the light source and to the lens.

2. An image-casting flashlight comprising:

a housing adapted to hold a battery;

a battery-powered LED light source mounted on the housing and directed forward along an axis;

a holder sleeve axially displaceable on the housing forward of and relative to the LED light source;

an image carrier fixed in the holder sleeve and axially aligned with the light source;

an end niece on the housing forward of the LED light source and of the image carrier; and a lens fixed in the end piece, whereby axial displacement of the holder sleeve moves the image carrier relative to the light source and to the lens, the end piece including an outer tube having a front end; and an inner tube coaxially received and fixed in the outer tube, holding the lens at the outer-tube front end, and axially slidable on the holder sleeve.

3. The image-casting flashlight defined in claim 2 wherein the outer and inner tubes have complementary inner and outer screwthreads by means of which they are connected fixedly together.

4. The image-casting flashlight defined in claim 1 wherein the holder tube has a plurality of angularly spaced, axially extending, and axially forwardly open slots subdividing a front end of the holder tube into a plurality of radially deflectable segments, the image carrier being engaged within the holder-tube front end, the flashlight further comprising an elastic ring engaged around the holder-tube front end and pressing the segments against the image carrier.

5. The image-casting flashlight defined in claim 1 wherein the housing has a tubular front end centered on the axis, formed with a screw thread, and projecting axially forward of the light source, the holder tube having an axially rearwardly extending rear end threadedly engaged in the housing front end.

6. The image-casting flashlight defined in claim 5 wherein the housing front-end screw thread is external and the holder rear end is internally threaded.

7. The image-casting flashlight defined in claim 5 wherein the housing includes a battery-holding rear sleeve having a front end; and an adapter threaded into the rear-sleeve front end and formed with the housing front end.

8. An image-casting flashlight comprising:

a cylindrically tubular housing adapted to hold a battery and centered on an axis;

a battery-powered LED light source mounted on a front end of the housing and directed forward along the axis;

a holder sleeve centered on the axis and axially displaceable on the housing forward of and relative to the LED light source;

a transversely extending image carrier in the holder sleeve and axially aligned with the light source;

means releasably securing the image carrier in the holder;

a tubular end piece on the housing centered on the axis forward of the LED light source and of the image carrier; and a lens fixed in tubular the end piece, whereby axial displacement of the holder sleeve moves the image carrier relative to the light source and to the lens.

9. The image-casting flashlight defined in claim 8 wherein the holder and housing are formed with interengaged screwthreads, whereby an axial distance between the light source and image carrier is adjusted by relatively rotating the holder and housing, the end piece being axially slidable on the holder, whereby an axial distance between the image carrier and lens is adjusted by relatively axially shifting the holder and end piece.

* * * * *